United States Patent [19]

Ember

[11] 4,218,077
[45] Aug. 19, 1980

[54] CONSTANT REMINDER MEMORANDUM DEVICE

[76] Inventor: Jean B. Ember, 426 Girard St., #101, Gaithersburg, Md. 20760

[21] Appl. No.: 17,337

[22] Filed: Mar. 5, 1979

[51] Int. Cl.³ ............................................. G09D 3/00
[52] U.S. Cl. .......................................... 283/2; 40/107
[58] Field of Search ..................... 283/2, 3, 4; 40/107, 40/120

[56] References Cited

U.S. PATENT DOCUMENTS

| | | | |
|---|---|---|---|
| 432,838 | 7/1890 | Robinson | 283/2 |
| 437,058 | 9/1890 | Story | 283/2 |
| 467,117 | 1/1892 | Hawkins | 283/2 |
| 1,222,612 | 4/1917 | Evans | 283/2 |
| 1,294,460 | 2/1919 | Heinz | 283/2 |
| 2,831,278 | 4/1958 | Myers | 40/107 |
| 3,964,195 | 6/1976 | Jordan | 283/2 X |

FOREIGN PATENT DOCUMENTS 985881   7/1951   France ........................................ 283/2

*Primary Examiner*—Paul A. Bell
*Attorney, Agent, or Firm*—Emil Anderson

[57] ABSTRACT

This invention involves chart means for the recordation of special events with means for facilitating the retrieval of such recorded events. In the preferred form, a single chart serves as a ready reminder of events and enables the user to observe at a glance events for a period of six (6) months at one time. In an expanded form, six (6) charts are furnished to provide more space for the recording of events to be remembered.

8 Claims, 5 Drawing Figures

CONSTANT REMINDER MEMORANDUM DEVICE

My invention relates to a new and unique memorandum device for readily and easily obtaining the dates of events such as birthdays, anniversaries, and other important events, falling on the same date every year. An important feature of the memorandum device resides in the fact that it is adapted for the recordation of the date of the event in any particular month, but not the particular day, thereby making the device a permanent and perpetual record usable year after year. The device of my invention furnishes a simple way of recording and retrieving information as to the date of occurrence of certain documented events.

There is disclosed two modifications of my invention. The uniqueness in the preferred modification lies in part in enabling a person (user) to observe at a glance events for a period of six months at one time.

Another object is to provide a simple and inexpensive device for recordation and retrieval of events serving as a constant reminder to the user of the device.

Another object is to provide a device containing interesting and useful information and serving as a simple and convenient educational aid.

The prior art memorandum devices are cumbersome to use and a yearly calendar has to be updated each year and is usually discarded at the end of a year. Other objects and advantages of my invention will become apparent in view of the specifications and drawings and from the appended claims.

Figure 1:
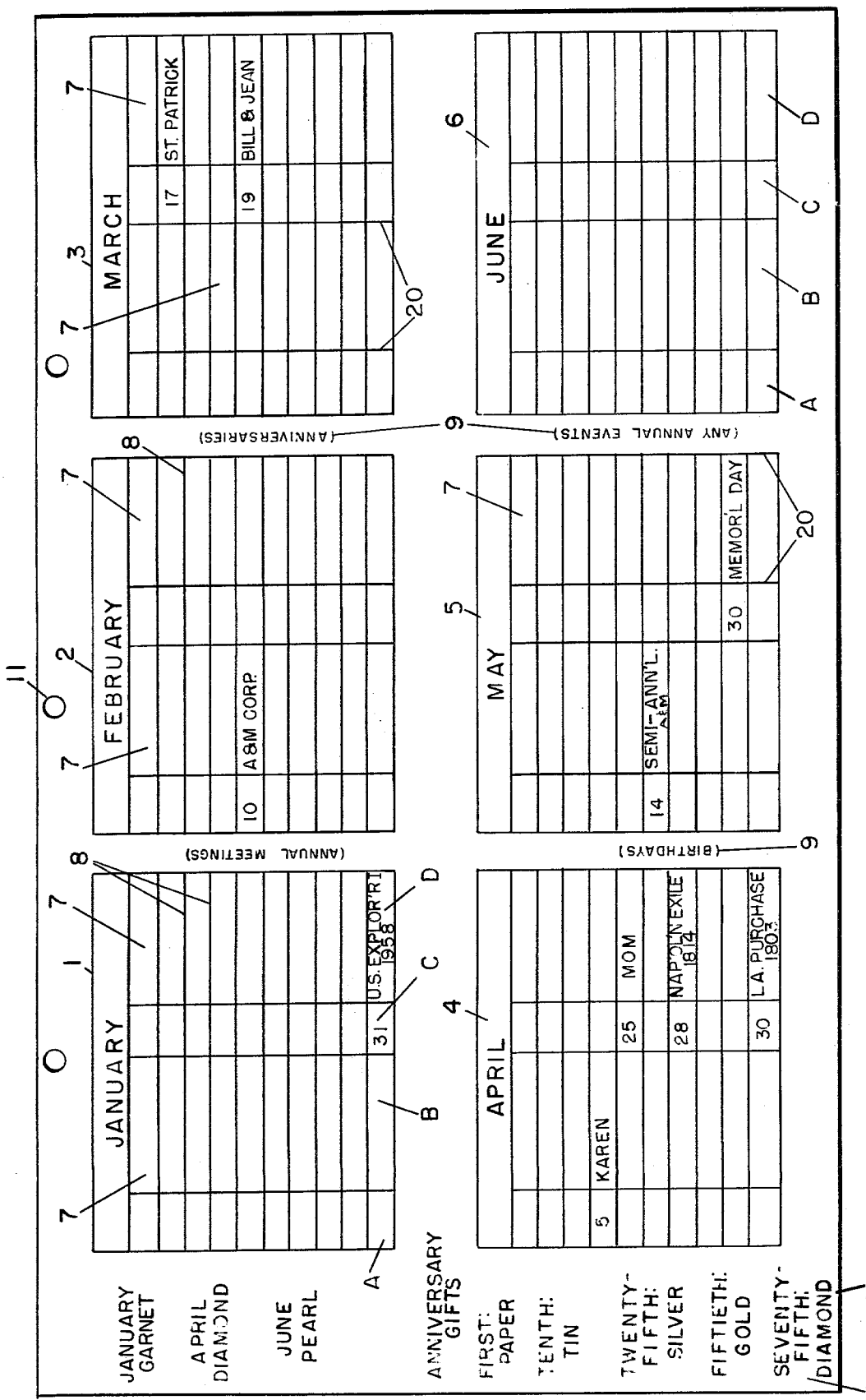
FIG. 1 is a plan view of one side of the preferred memorandum sheet for events to be recorded for the first six months of a year.

In the preferred form, FIG. 1, the single chart or sheet involved is indicated by numeral 25, on the major portion of which there are arranged six polygonally shaped sections 1 to 6 respectively for the months January to June. Each section for each month has four columns labelled A, B, C, and D formed by the vertical demarcation lines 20. Numerals 7 in columns B and D represent a plurality of rows of spaces or areas bounded by substantially parallel horizontal demarcation lines 8 for the recordation of the name of a person or the event desired to be remembered such as birthdays, anniversaries, and other historical events. Columns A and C are provided for the recordation of the actual date, and, if desired, the year of the event to be remembered.

Certain documented events and associated dates are illustrated in several of the months. The dates of the events recorded may be made in chronological order or may be made in any order desired, and new events and associated dates may, of course, be added at any time. There are shown twenty spaces for notations of events for each month which is thought to be sufficient for family use and for small businesses. Numeral 9 refers to certain subject matter which may be recorded in the various sections. However, the subject positioned adjacent a section should not be considered entirely exclusive, as for example, the events for the month of April need not be limited to birthdays but may include other events as shown in FIG. 1. Hence, the subjects listed, each enclosed in parentheses, are merely indications of what type of events are or may be recorded on the chart as a whole. A rectangular space or areas 10 arranged laterally of said sections is provided for the insertion of birthstone, wedding anniversary, and/or other data describing or otherwise relating to the recorded events on the chart.

The reminder chart may be made in any size. It may be provided with an aperture shown at 11 for hanging on a wall for large size poster charts, or provided with apertures for insertion in a loose leaf notebook. The charts may, however, be made of a size to fit in a briefcase or a purse.

Figure 2:
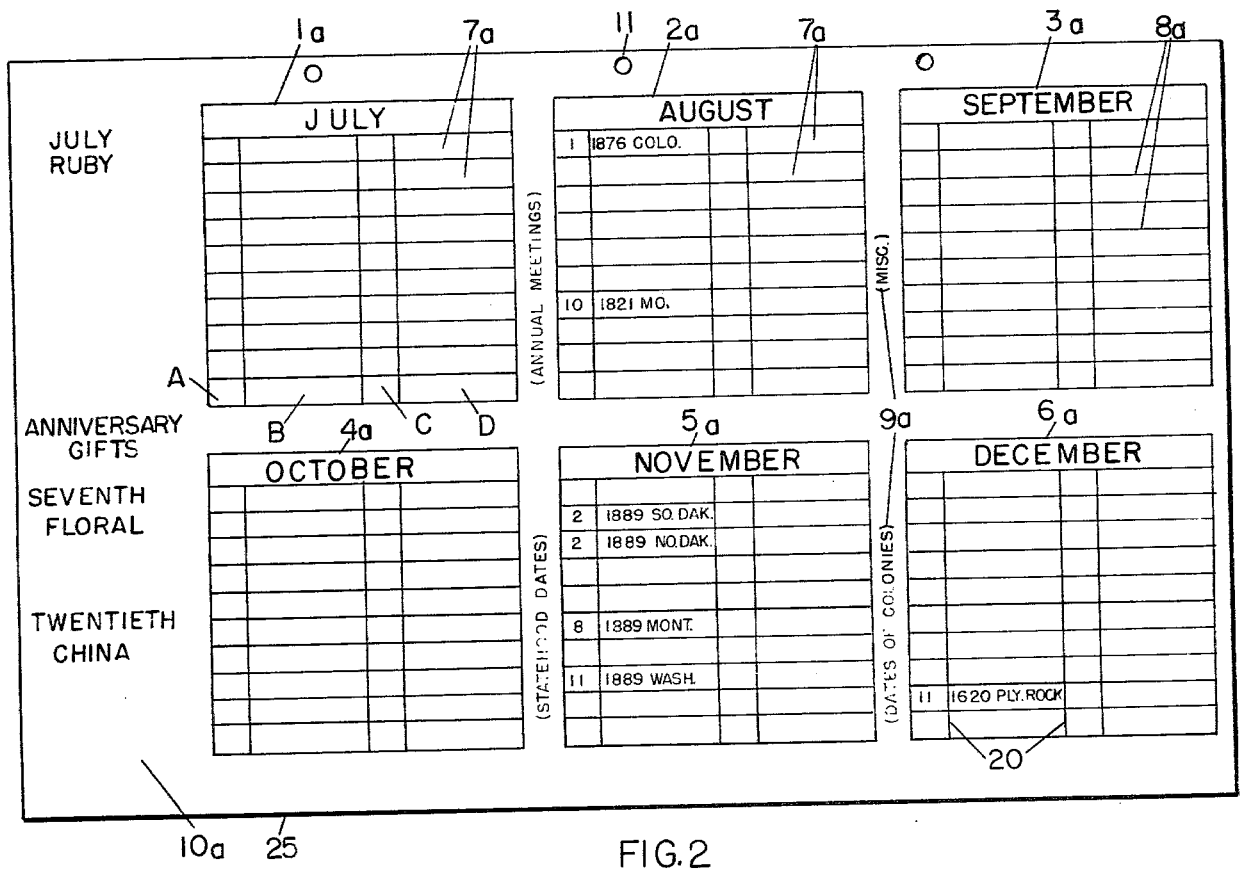
FIG. 2 shows the reverse side for the last six months of the year.

FIG. 2 illustrates the reverse side of the sheet of FIG. 1 and shows six sections 1a to 6a, each headed respectively by the months July to December. The said reverse side differs from that described in FIG. 1 only in the names of the months and in the nature of the events 7a and dates inserted in columns A, B, C, and D. The numerals with appropriate subscripts in FIG. 2 represent analogous parts to that shown in FIG. 1.

Accordingly, as seen in FIGS. 1 and 2, important historical events and their respective dates, such as dates of colonization in America and the admission of the various states to the Union are recorded in Columns A, B, C, and D, rendering the device useful for students.

This invention contemplates that the said events and associated dates may be initially inserted when the chart or sheet is manufactured or such events may be inserted by the user of the device.

Figure 3:
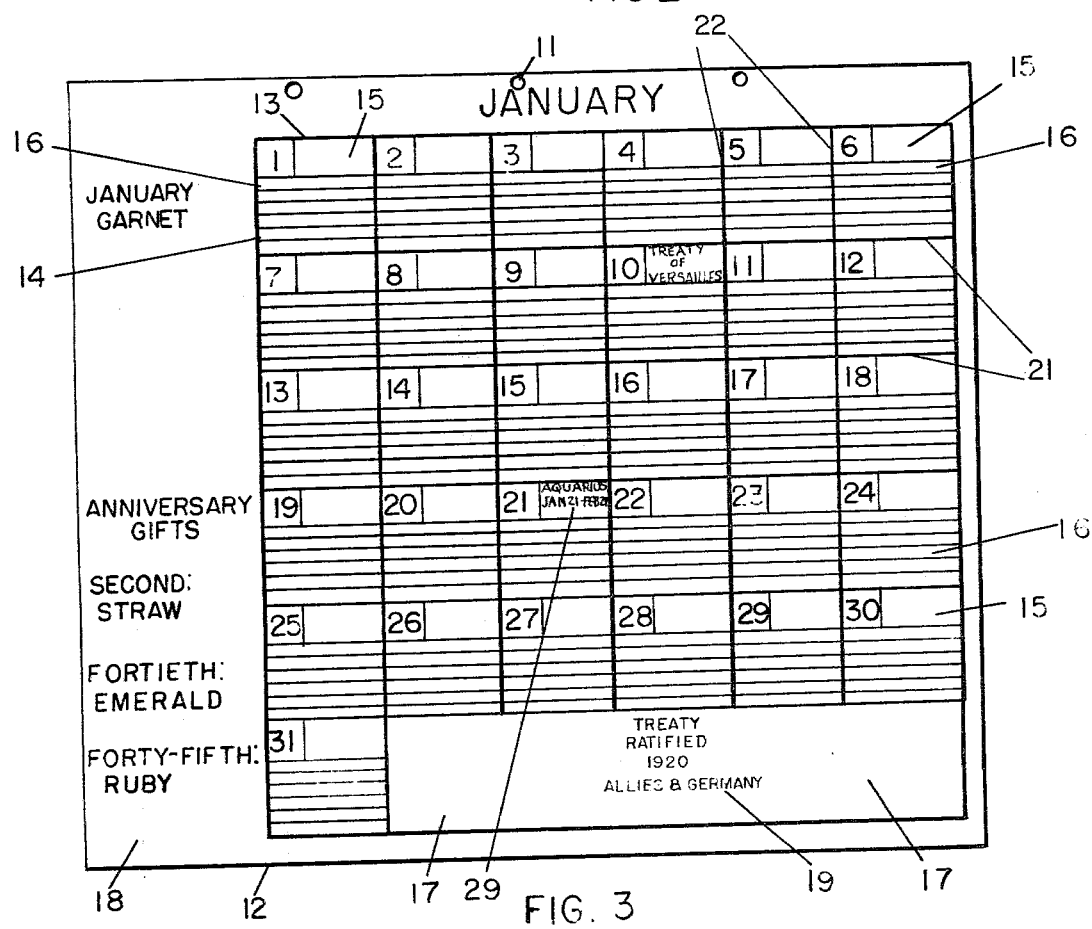
FIGS. 3, 4 and 5 illustrate various aspects of an alternate form of my invention.
Figure 4:
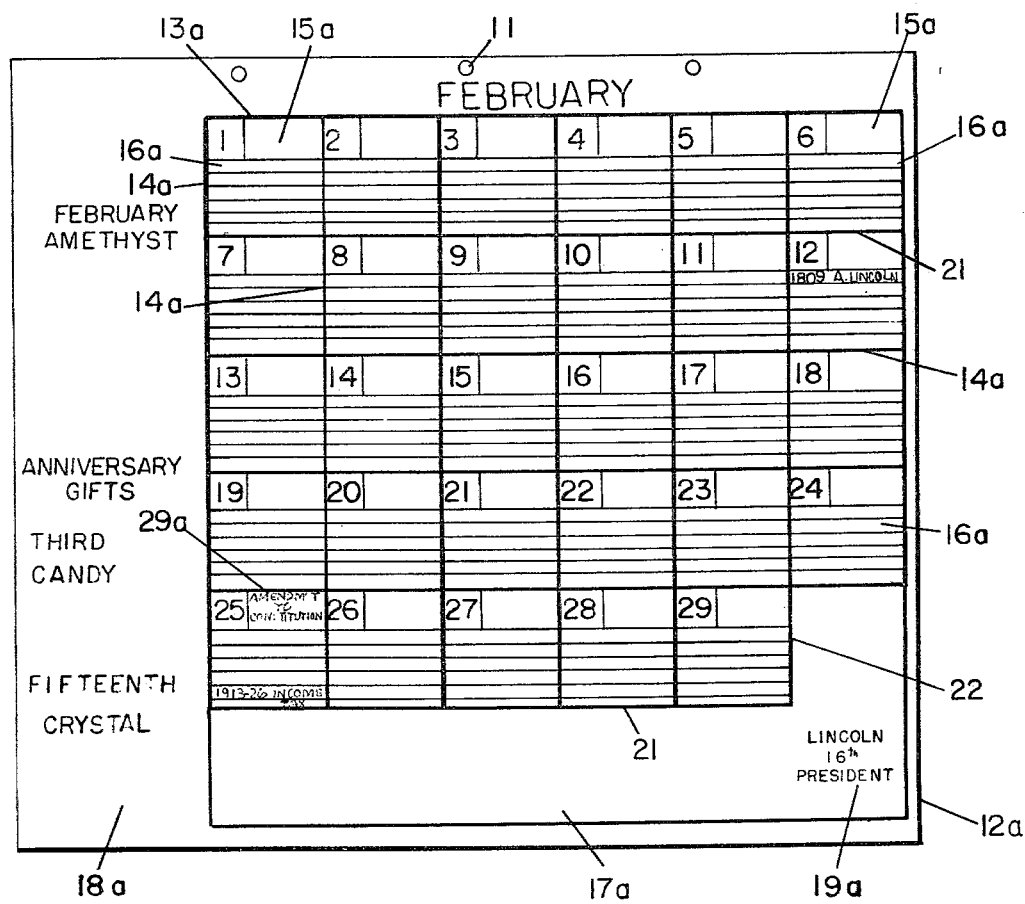
Figure 5:
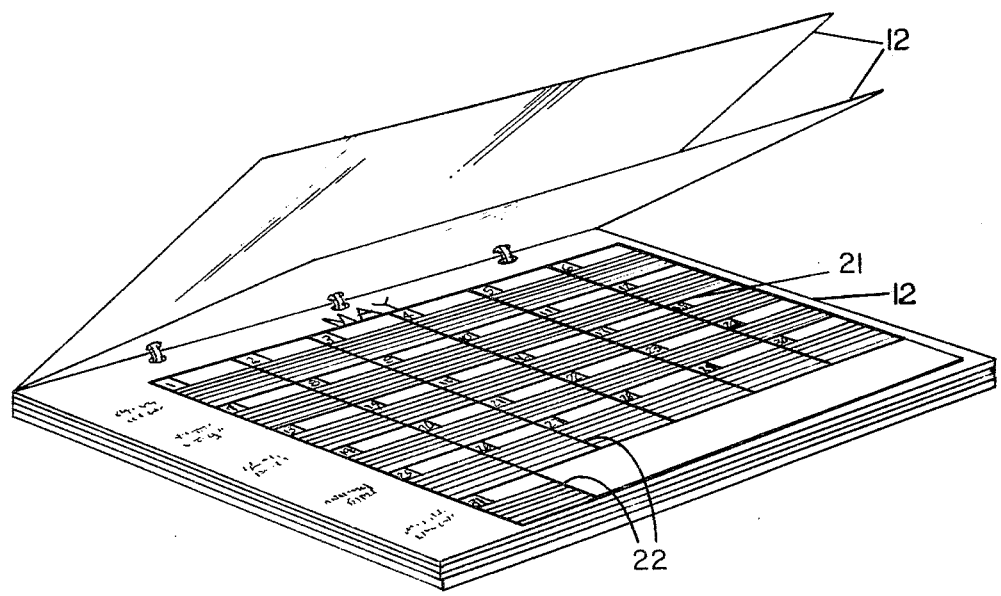

The modification illustrated in FIGS. 3, 4 and 5 represents an expansion of the first modification in that six charts are provided, the two sides of each chart being headed by different months, thereby furnishing more space for recordation of events for each day in each month. In FIG. 3 is shown the front side of chart 12 having on a major portion thereof a substantially square shaped section 13 headed by the name of a month, namely January. The said section 13 is divided into thirty-one polygonally shaped areas labelled 14 for the said month of January, by the intersecting horizontal and vertical demarcation lines 21, 22. As seen in FIGS. 3 and 5 the vertical line 22 divides the memorandum sheet into six columns and the horizontal line 21 into six rows. However, as illustrated in said figures, some of the vertical demarcation lines 21 terminate short of the lowest horizontal line so as to form 31 record areas for these months, one area for each day of the month. Starting at the left hand end of row one the areas are numbered 1 to 31 consecutively for these months January and May and for all other months having 31 days. As a consequence of the six column arrangement each row (excepting the last one) covers records for six days. This six column arrangement and the concept of placing numeral 1, i.e., the first day of the month, at the left hand end of row one applies to all the monthly charts of the modification illustrated in FIGS. 3, 4 and 5. Laterally of each numeral there is a clear space numbered 15, adapted to contain astrological data 29 FIG. 3 or may serve as a topical heading descriptive of specific recorded events, see 29a in FIG. 4. Below each date numeral and space 15, there is provided at least five ruled lines providing spaces 16 for the recording of the desired documented and/or anticipated event which occurred on the respective days of the month. The remaining area 17 which has neither horizontal nor vertical lines and no numerals is provided for the recordation of descriptive notes 19, and other similar data relative to the recorded events. Area 17 may however be provided with horizontal lines and spaces for entry of descriptive material.

On the left hand edge of the chart is shown a rectangular area 18 adapted for the entry of birthstones and wedding anniversaries or other data descriptive of the recorded events on the chart. FIG. 4 is a view showing the reverse side of the chart shown in FIG. 3, the section having a heading February, showing twenty-nine days.

FIG. 4 illustrates a chart for February and has twenty-nine polygonally shaped areas 14a, the areas being numbered from one to twenty-nine and the first day of the month appears at the extreme left hand end of row one. Areas 16a, 15a, 18a and 17a respectively, are adapted for entry of data similar to that described with respect to areas 16, 15, 18 and 17 in FIG. 3, namely special events to be remembered, astrology, birthstones and wedding anniversaries, and descriptive notes. The chart of FIG. 4 differs from FIG. 3 only in the number of polygonally shaped areas, the events recorded and the descriptive material. It is to be noted that in the alternate form, FIGS. 3 and 4, there is more space than in the form of FIGS. 1 and 2 for insertion of important or significant events for each month, making the device suitable for social or business organizations as well as for family use.

Unlike an ordinary calendar, the first day of every month (January to December, inclusive) appears in the extreme upper left hand area (14 in FIG. 3) for each of the twelve months.

FIG. 5 is a perspective view of the charts of FIGS. 3 and 4, joined together in a plural ring notebook showing certain of the charts thereof spread apart slightly for clearness of illustration. It should be noted that the other four charts, not shown in detail differ from that of the charts of FIGS. 3 and 4 only in the names of the months, namely the months of March to December, and in the material recorded thereon.

As stated above, important features of this invention reside in the fact that the device is simple and inexpensive, and since only the dates of the events to be remembered, and not the days of the week, are utilized, the device provides a perpetual record, usable year after year.

While the above described and illustrated drawings disclose the preferred embodiments of the invention, it is to be understood that minor changes may be resorted to in commercial adaptation of the invention without departing from the scope of the invention as hereinafter claimed.

I claim:

1. In a device for the recordation of important events and for facilitating visual retrieval of the dates in any month of such events without regard to the days of the week of such events, comprising chart means having twelve sections thereon one section for each month and each section headed by the name of a month, a plurality of horizontal demarcation lines in said sections beneath said monthly heading, a plurality of vertical demarcation lines forming no more than six columns, said lines intersecting the horizontal lines to thereby form a plurality of rows of polygonally shaped recording areas, one row beneath another there being no more than six recording areas in any row and the number of rows being considerably less than the number of days in any month, numeral 1 for the first day of every month positioned at the left hand end of the top row, the recording areas being designed solely for the recordation of events and associated dates at which such events occurred, there being no provisions to indicate the day of the week at which the event occurred, whereby since the date on which the event occurred is independent of the day of the week, the said device serves as a perpetual record usable year after year, said chart means having a rectangular shaped area spaced laterally of said sections designed for the recordation of birthstones, wedding anniversaries and other similar data descriptive of said recorded events.

2. The structure of claim 1, wherein the said chart means consists of a single chart having six separate sections on each side of said chart each section being headed by the name of a month, the names of the months being in chronological order, i.e. January to June inclusive on one side of the chart and the remaining six months shown on the reverse side thereby providing a six-month visual display of events at one glance on each side of said chart.

3. The structure of claim 1, wherein the chart means consists of a series of six charts, each side of each chart having one section and bearing the name of a month at the top thereof, each section having produced thereon a plurality of polygonally shaped recording areas equal in number to the number of days in the particular month, the recording areas being arranged in six rows one beneath the other and there being no more than six such areas in any one row, there being a numeral in each of said polygonally shaped recording areas, numeral one, i.e., the first day of every month appearing in the extreme left hand area of the top row, on each chart and the numerals for the other days in the month follow consecutively in the other rows, there being clear spaces laterally of said numerals for the recordation of astrological and data descriptive of the recorded events, there being several ruled lines in each said polygonally shaped area below said numerals providing spaces for recordation and visual retrieval of the events which occurred on the respective days of the month, the remaining area within each section having no ruled lines providing spaces for recordation of descriptive notes relative to the recorded events.

4. A device for producing an immediate and a more or less permanent constant reminder facilitating the visual retrieval of documented events which took place on a specific date in a month without regard to the day of the week of such event, comprising a chart having on one side thereof six separate sections, each section being headed by the name of a month, i.e. January to June, inclusive, each section having a plurality of spaced horizontal demarcation lines beneath said month heading the spaces between said horizontal line forming rows adapted for entry of the desired events and their associated dates, the number of said horizontal lines and hence the number of rows being considerably less than the number of days in any month, a plurality of vertical demarcation lines forming no more than four columns intersecting said horizontal lines, the extreme left hand column being designed for the entry of dates of the month at which the event occurred and the adjacent column for the entry of the name of the event, the reverse side of the chart having the same number of sections and the same line and space arrangement but the sections being headed by the names of the remaining months, July to December inclusive, thereby providing a six month visual display of events at a glance on one side of the chart, whereby since the date of the event is independent of the particular day of the week, thus rendering the device a perpetual record usable year after year.

5. The structure of claim 4, wherein the first and third columns are relatively narrow and the second and fourth columns relatively wider, thus providing relatively short spaces for the insertion of the numerical dates of the month in which the said documented events occurred and relatively longer spaces for the entry of the documented event.

6. The structure of claim 4, wherein there are rectangular shaped clear areas between said sections for the recordation of the topical subject matter contained in the various sections.

7. A device providing an easily accessible and permanent reminder facilitating visual retrieval of documented events and events anticipated on specific dates of any month of the year without regard to the day of the week of such events, comprising a series of six charts, each side of each chart having a polygonally shaped section bearing a name of a month at the top thereof, thus providing the names of twelve months of a year on the six charts, each side of each section having produced thereon a plurality of parallel horizontal demarcation lines, a plurality of vertical demarcation lines not exceeding seven in number intersecting said horizontal lines, some of said vertical lines terminating short of the bottom horizontal line thereby producing polygonally shaped areas, one area for each day of the particular month, the areas being arranged in six rows for each month having 31 days and five rows for all the other months, there being no more than six such areas in any one row and there being a numeral in each of said polygonally shaped areas numbered up to the number of days in the particular month, the first day of every month, i.e. numeral 1, appearing in the extreme left hand area of the top row, on each section which numeral is followed by numerals 2 to 6 inclusive in said first row the remaining days being consecutively numbered in the remaining rows, there being a clear space in each of said areas laterally of the numerals for the recordation of astrological and other data relative to the recorded events, there being about five ruled lines in each said polygonally shaped area below said numerals providing longitudinal spaces for recordation of said documented and/or anticipated events which occurred on the respective days of the month, the remaining area within each section which has no numerals or ruled lines providing spaces for recordation of descriptive notes relative to the recorded events, whereby since the numeral representing the date in a particular month on which an event occurs is independent of the day of the week, the said device serves as a perpetual record, usable year after year.

8. The structure of claim 7, wherein each chart has a rectangular shaped clear portion spaced laterally of each of said sections for the recordation of birthstone, wedding anniversary, and/or other data descriptive of the recorded events.

* * * * *